United States Patent [19]

Gramespacher et al.

[11] 4,055,095
[45] Oct. 25, 1977

[54] TOOL CHANGING DEVICE FOR A LATHE

[75] Inventors: Herbert Gramespacher; Armin Feisel, both of Schaffhausen, Switzerland

[73] Assignee: Georg Fischer Aktiengesellschaft, Switzerland

[21] Appl. No.: 667,352

[22] Filed: Mar. 16, 1976

[30] Foreign Application Priority Data

Mar. 27, 1975 Switzerland ............ 3934/75

[51] Int. Cl.² ............ B23B 29/00; B23Q 1/00; B23B 39/20
[52] U.S. Cl. ............ 82/36 A; 29/568; 408/35
[58] Field of Search ............ 82/36, 36 A, 36 B, 2, 82/2 B; 408/35; 29/568, 26 A

[56] References Cited

U.S. PATENT DOCUMENTS

| 2,859,644 | 11/1958 | Watts | 29/26 A |
|---|---|---|---|
| 2,952,170 | 9/1960 | Hansen et al. | 408/35 |
| 3,191,470 | 6/1965 | Pabst et al. | 82/36 A |
| 3,203,017 | 8/1965 | Holzl | 408/35 |
| 3,406,607 | 10/1968 | Hill | 29/568 |
| 3,601,886 | 8/1971 | Gohren et al. | 82/2 R |

Primary Examiner—Harrison L. Hinson
Attorney, Agent, or Firm—Roylance, Abrams, Berdo & Kaul

[57] ABSTRACT

A tool changing device for a lathe of the type having a base structure with parallel column guides for longitudinal movement of a tool storage and changing device. The tool changer disclosed is a generally circular tool magazine, a cross slide member mounted on the longitudinal guide means of the lathe, the magazine surrounding one of the longitudinal guides. The tool changer is rotatably movable to select one of a plurality of tools circularly disposed thereon to bring the desired tool to a position adjacent the axis of rotation of a workpiece supported on the lathe. When the selected workpiece is in position, the apparatus establishes a rigid and direct connection between the selected tool holder and the lathe with the tool holder remaining on the magazine. Seals are provided to prevent turnings and other dirt from entering the tool changing mechanism.

5 Claims, 5 Drawing Figures

TOOL CHANGING DEVICE FOR A LATHE

This invention relates to a tool carrying and changing device for a lathe.

BACKGROUND OF THE INVENTION

It is known to provide an apparatus on a lathe for holding a plurality of tools, any one of which can be brought into a work position adjacent a rotatable workpiece also carried on the lathe. In U.S. Pat. No. 3,867,756, there is shown a tool changing device in which the tool holder is moved between a magazine or storage position and an operating position on a turret of the lathe cross slide by means of a transfer device in a single rectilinear movement. The magazine, constructed in the form of an endless belt, is guided around two reversing points and is also connected with the cross slide. This obviates the travel paths of the cross slide and longitudinal slide during tool change necessary in the case of stationary magazines so that idle times are greatly reduced.

However, this structure has the disadvantage that it is necessary to move rather large masses together with the cross slide. It is also difficult to protect such a tool-changing device from the turnings which are cut from the workpiece and from other dirt during the working sequence, the turnings and dirt frequently leading to operating faults and imprecise turning work.

BRIEF SUMMARY OF THE INVENTION

An object of the present invention is to provide a tool changing device which employs a particularly simple and operationally reliable movement sequence during the tool change, and which requires relatively few moving parts with the result that the cost of construction, the space requirements and the resulting mass to be moved are significantly reduced. In addition, the structure provides a number of stored tools which is sufficient to meet the necessary requirements for both internal and external cutting of the turned parts, particularly on digitally-controlled lathes.

Briefly described, the invention is directed to a tool-changing apparatus for use on a lathe of the type having a base structure, longitudinal guide means and means for holding a workpiece for rotation about an axis, the apparatus including the combination comprising a plurality of tool holders each adapted to replaceably hold a tool, a tool magazine for supporting the tool holders, a cross slide member slidably mounted on the longitudinal guide means of the lathe, means for mounting the tool magazine on the cross slide, the magazine being movable to cause each tool and tool holder to follow a curvilinear path whereby each of the tools can be moved to a working position adjacent the workpiece lying adjacent the path, and means for establishing a rigid and direct connection between any selected one of the tool holders and the cross slide when the selected tool holder is moved through the path to the working position while the tool holder remains on the magazine.

This structure retains the advantages of the prior art wherein the tool magazine is arranged on a cross slide and wherein the tool and tool holder are directly and rigidly connected to the cross slide in a predetermined position determined by a work-holding fixture through the direct transportation of the tool holder by means of the tool magazine to the working position on the cross slide, but in addition this invention makes it possible to eliminate the transfer device with its drives and gripping devices.

It will be observed that the more conventional multiple tool turrets are in direct contrast to the present invention and do not form part of this particular art. In the turret arrangements, the tool holders are rigidly connected by means of work-holding fixtures to the turret which accomplishes the conveying of tools to the working position and necessitates the absorption of the cutting forces by the turret itself. Due to the requirement, in the turret structure, of very stable construction, multiple tool turrets are only suitable for a much smaller number of tools, thus restricting their utility and flexibility.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
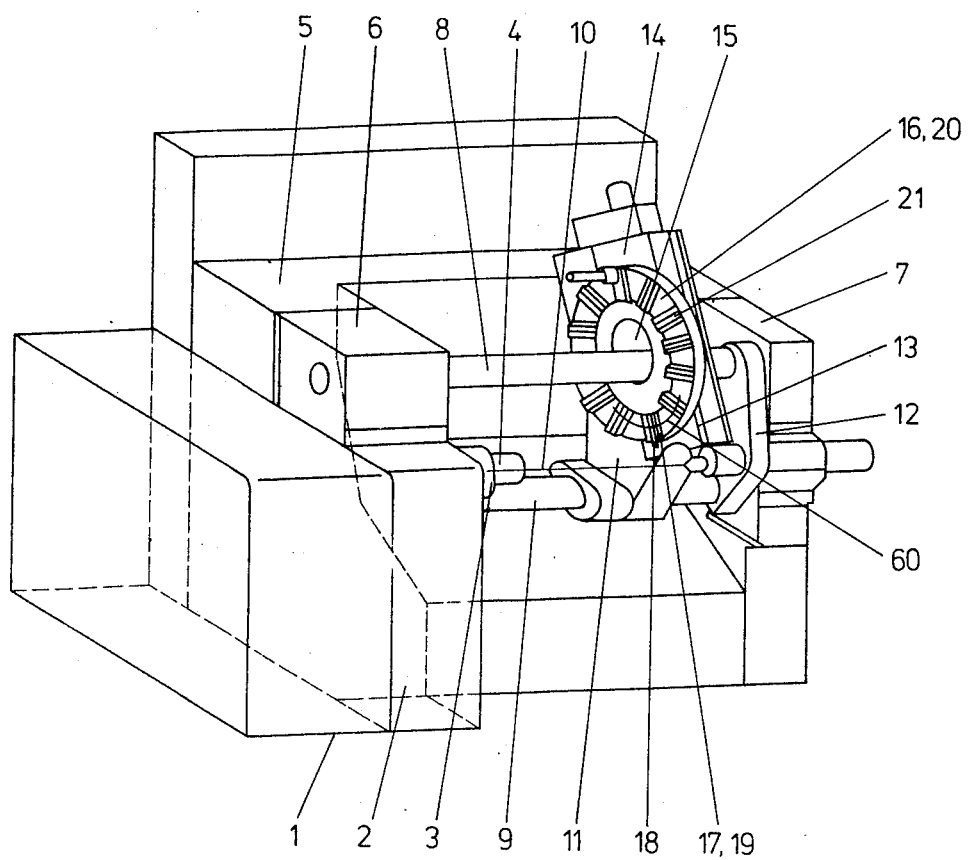
FIG. 1 is a perspective view of a lathe having a tool changing device according to the invention.

As shown in the overall view of FIG. 1, the lathe 1 includes a headstock 2 having a chuck 3 for receiving and gripping a workpiece 4 and for permitting rotation of that workpiece about its central axis. The base member of the lathe includes a column 5 which has side portions 6 and 7 rigidly affixed thereto. Column guides 8 and 9 are supported on and between side portions 6 and 7 to form guides along which the tool supporting and changing mechanism can slide longitudinally. Column guides 8 and 9 in the embodiment shown are constructed as tubular circular members. A longitudinal slide member 11 is supported on column guides 8 and 9 so as to be longitudinally slidable thereon in a direction parallel to the axis of rotation 10 of workpiece 4. Column guides 8 and 9 also support tailstock 12. Guide surfaces 13 are provided on one face of longitudinal slide member 11 on the side facing headstock 2 with a cross slide 14 displaceably mounted for sliding movement on guides 13 in a direction toward and away from axis 10. Cross slide 14 is provided with a recess 15 which is elongated in its direction of movement and is so arranged on slide 11 that it envelops and surrounds the upper column guide 8.

Figure 4:
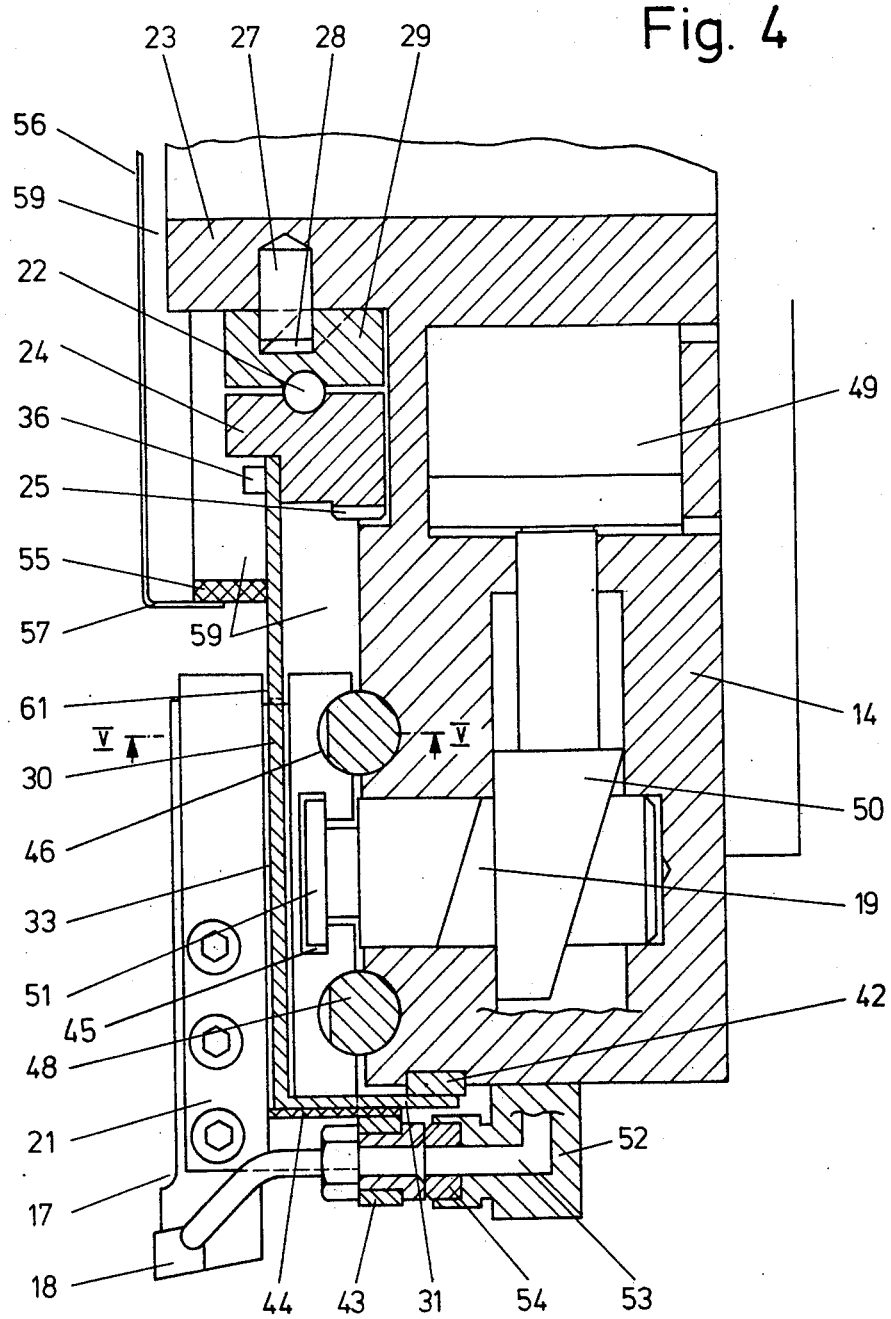
FIG. 4 is an enlarged sectional view of a portion of the tool changing device along a radius thereof.

The tool changing apparatus 16 and the operating position 17 with work-holding fixture 19 for tools 18 are also arranged on that side of cross slide 14 which faces headstock 2, as can also be seen in FIG. 4. The tool changing device 16 includes a tool magazine 20 and tool holders 21 which are movable therewith along a curved path so that the operation position 17 is located along the curved path of the tool holder. In the representative embodiment disclosed herein, the curved path is a circular path and the tool magazine is constructed as a circular disc magazine 20 having an axis of rotation which passes through the center of recess 15 and is parallel to the workpiece rotation axis 10. Thus, disc magazine 20 also surrounds upper column guide 8 of longitudinal slide 11 so that the necessary number of tools, 15 in number in the embodiment disclosed, for a digitally-controlled lathe, can be stored on the periphery of disc magazine 20 with sufficient spacing therebetween to prevent interference between the tools and the workpiece. Despite the size of the disc magazine and its tool holding capacity, the distance between the tool-operating position 17 and column guides 8 and 9 is relatively small, resulting in an advantageous short flux of force in the lathe structure.

Figure 2:
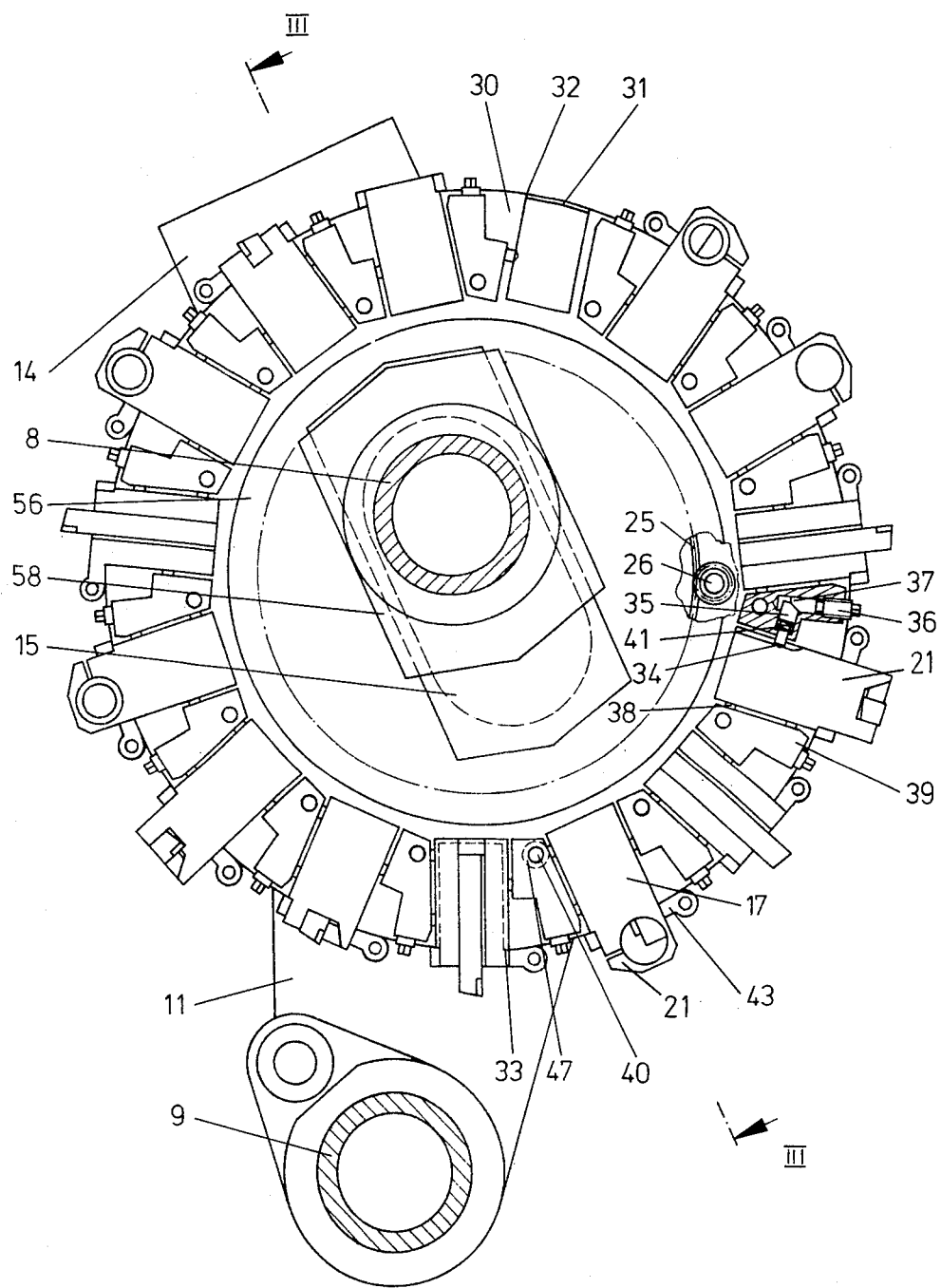
FIG. 2 is a side elevation of the tool changing device itself, viewed in a direction parallel with the workpiece rotation axis.
Figure 3:
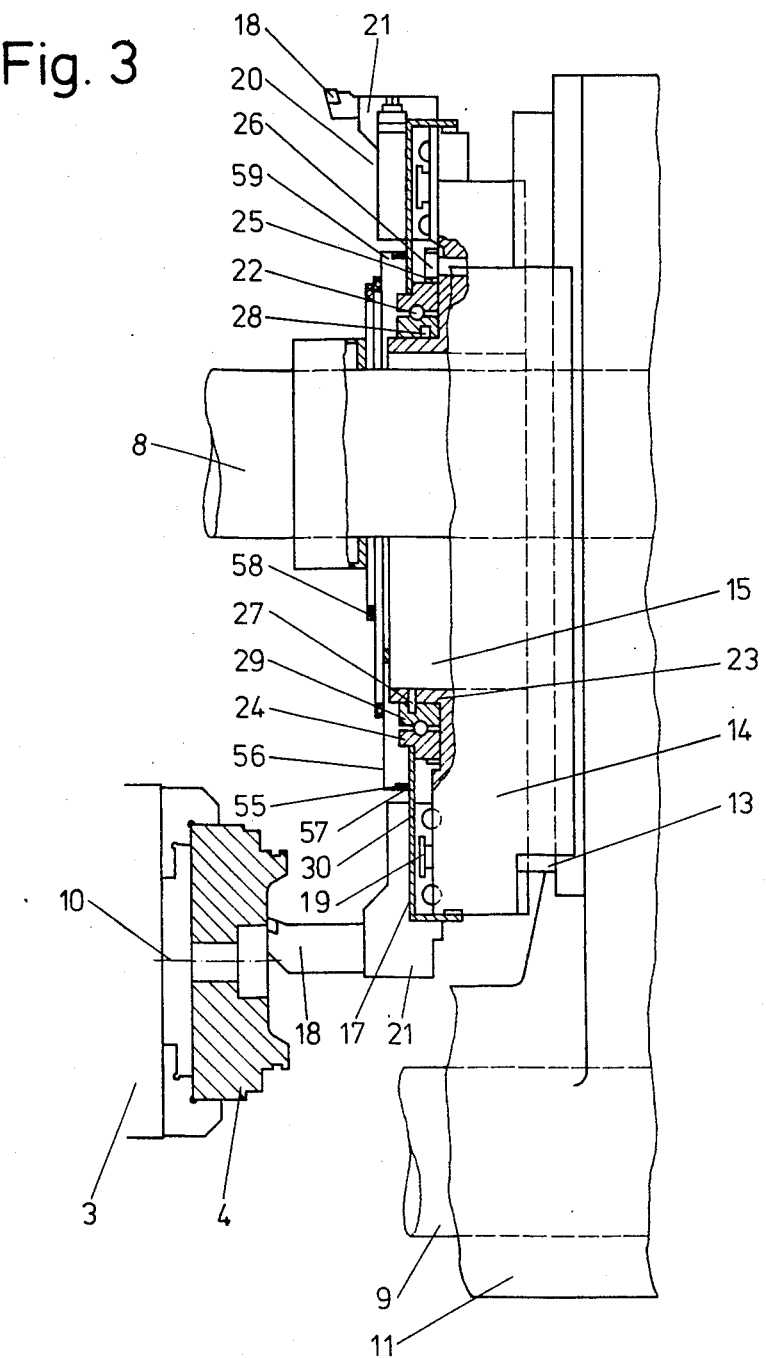
FIG. 3 is a sectional view along lines III-III of FIG. 2.

As can be seen from FIGS. 2 and 3, the disc magazine 20 is centered on a cylindrical shoulder 23 of cross slide 14 by means of a ring mount 22. An outer ring 24 is provided with teeth 25 which engage the pinion of a drive motor, not shown. Peripherally positioned pins 27 protrude radially from cylindrical shoulder 23 and are circularly spaced apart in such a way that they engage in corresponding thread-like grooves 28. An hydraulic cylinder, not shown, which engages tangentially on an inner ring 29 causes, when operated, a rotation of inner ring 29 through a predetermined angle which simultaneously causes an axial lifting movement of disc magazine 20 due to the twisting between pin 27 and groove 28, this also being visible in FIG. 4.

Figure 5:
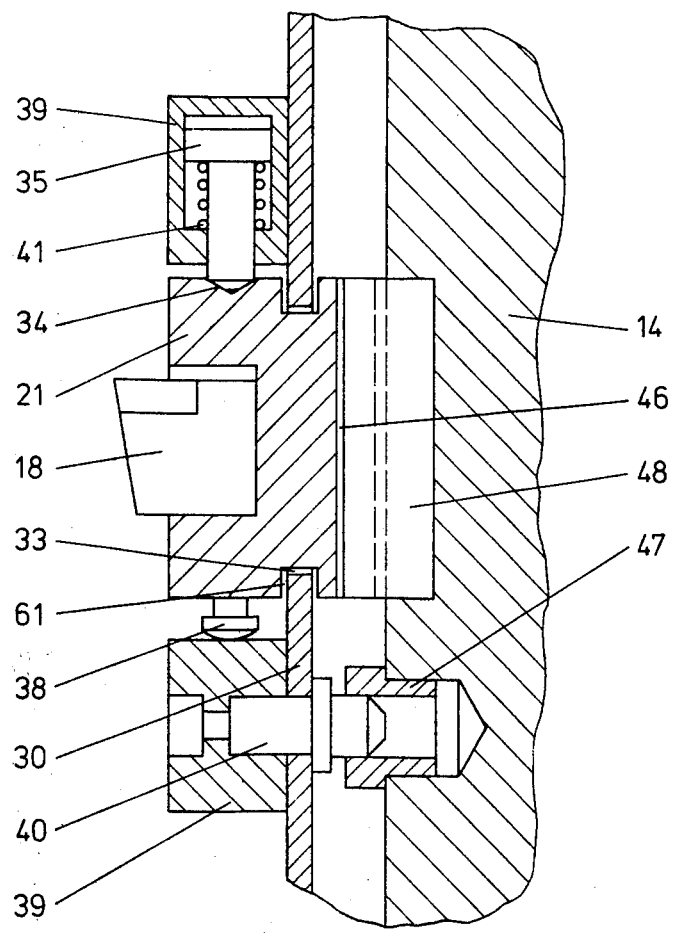
FIG. 5 is a partial sectional view along lines V-V of FIG. 4.

Disc 30 which has a circular annular rim 31 and which is fixed to outer ring 24 is peripherally provided with radially-directed rectangular recesses 32 for receiving tool holders 21 so that the recesses 32 circularly disposed around the rim of disc 30 engage tool holders 21 on three sides, axially securing the tool holders with a clearance and simultaneously forming a labyrinth gland 61 for sealing the magazine inner area 59, this also being visible in FIG. 5.

In the radial direction, each of the tool holders 21 is secured by a pin 35 which engages a conical countersunk portion 34 on tool holder 21 so that pin 35 is engaged with tool holder 21 by means of a screw 36 operating through pin 37. Thus, the tool holders are positioned on stop plates 39 by the center height setscrews 38 so that the plates are firmly connected by screws and index pins 40 with disc 30 between recesses 32. The indexing pins 40 simultaneously serve to position the disc magazine so that, in each case, only a specific index pin 40 at the working position engages in a bushing 47 on the cross slide, as seen in FIGS. 2 and 5.

In order to replace tool holder 21, the screw 36, which is easily accessible from the outer exposed portion of the tool changing apparatus, is loosened until pin 37 is retracted, permitting spring 41 to cause pin 35 to retract into the body of the disc, the distal end of pin 35 being extracted from the countersunk portion 34, permitting tool holder 21 to be radially extracted from the disc magazine.

The portion of rim 31 which is not provided with recesses 32 engages via the cross slide 14 and forms, with a ring 42 fitted to the cross slide, a seal between disc magazine 20 and cross slide 14. Cooling water is provided to the apparatus through a connecting piece 43 fitted to tool holders 21. This assembly is provided with a rubber plate 44 to provide a peripheral seal between the tool holder and the disc magazine.

A ring 55 is provided on disc 30 inside recesses 32 which, together with the cover plate 56 fixed to cross slide 14 and provided with a rim 57, insures the sealing of the magazine inner area 59 relative to the outside. Protective plates 58 cover recess 15 on the cross slide.

Tool holders 21 are provided on the side facing the cross slide 14 with a chuck groove 44 and two positioning grooves 46 as seen in FIG. 4. Apart from the tool changer, tools 18 are adjusted with an optical presetting device in tool holders 21 with reference to the positioning grooves 46, and the adjustment of the center height of the tools is performed by means of setscrews 38.

FIGS. 4 and 5 show the operating position 17 on cross slide 14 with the positioning pin 48 and the work-holding fixture 19 including chucking cylinder 49, wedge-shaped member 50 and chucking member 51. The tool holder 21 and working position 17 is secured in a position determined by the positioning grooves 46 which mate with positioning pins 48 by means of chucking member 51 engaging in chuck groove 45 due to the force applied through the actuation of chucking cylinder 49. Therefore, the cutting forces which occur are transferred directly from the tool holder to the cross slide.

During the securing of the tool holder on the cross slide the cooling water inlet 52 on cross slide 14 at operating position 17 is simultaneously connected with the cooling water connecting piece 43, leading to the sealing of supply line 53 by rubber member 54.

A movement sequence during a tool change will now be described. First, due to the action of chucking cylinder 49 on the piston rod side, chucking member 51 is freed from the force applied by wedge-shaped member 50. Subsequently, the hydraulic cylinder acting tangentially on the inner ring 29 is operated so that, as previously described, the disc magazine 20 is axially moved away from the cross slide 14 until the tool holder 21 located at the operating position 17 is raised from positioning pin 48 by disc 30 engaging in grooves 33, chucking member 51 also performing this movement. Simultaneously, the indexing of disc magazine 20 between index pin 40 and bushing 47 is commenced. When the lifting movement is at an end, the disc magazine is turned by a motor driving pinion 26 until the next tool required for the next step in the cutting process, together with the corresponding tool holder, is located adjacent operating position 17, whereby, simultaneously, the chucking member 51 is introduced into chuck groove 45. To insure short tool change times, theshortest path between the necessary tool and the operating position is always selective, which movement is insured by selecting the corresponding rotation direction of the disc magazine. On reaching the new position, the drive motor is switched off by a cam control, not showing having a revolution counter. Simultaneously, the disc magazine is brought into a position location by an axial movement in the direction of cross slide 14, produced by the return rotation of inner ring 29 by means of an hydraulic cylinder, with the simultaneous introduction of indexing pin 40 located at the operating position into bushing 47.

Tool holder 21 located at operating position 17, while simultaneously remaining on disc magazine 20, reaches a position determined by grooves 46 and pins 48 on cross slide 14, being rigidly connected with the cross slide by operating the work-holding fixture 19. Thus, tool holder 21 is positively and directly force locked with the cross slide, resulting in a shorter flux of force.

Movements in only two planes, i.e., the axial lifting movement and the rotary movement of the disc magazine, are the only movements necessary for the tool change. This results in an uncomplicated movement sequence with limited expenditure in the construction of the apparatus. Due to the circular construction of the disc magazine in conjunction with the fact that the magazine surrounds the upper column guide, it is possible to store a large number of tool holders in the magazine. In addition, due to the simple construction of the seals, the cross slide, including the mounting cables of the tool holder, are protected from turnings and dirt during the entire operating sequence and, therefore, during the tool change, thus permitting a more reliable operation.

It will be recognized that other configurations and arrangements of the tool magazine are possible such as elongated chain magazines, providing that the operating position of the tool on the cross slide is located on the path curve of the tool holder moved with the tool magazine.

While one advantageous embodiment has been chosen to illustrate the invention, it will be understood by those skilled in the art that various changes and modifications can be made therein without departing from the scope of the invention as defined in the appended claims.

What is claimed is

1. Tool changing apparatus for use on a lathe of the type having a base structure, longitudinal guide means and means for holding a workpiece for rotation about an axis, the apparatus including the combination comprising a plurality of tool holders each one adapted to hold a tool;

a tool magazine for replaceably supporting said plurality of tool holders in an unclamped condition;

a cross slide member slidably mounted on the longitudinal guide means of said lathe;

means for mounting said tool magazine on said cross slide, said magazine being movable to cause each tool and tool holder to follow a curvilinear path so that any one of said tools can selectively be moved to a working position adjacent the workpiece lying adjacent said path; and means on said cross slide for establishing a rigid and direct connection between any selected one of said tool holders and said cross slide when said selected tool holder is moved through said path to said working position while said tool holder remains on said magazine.

2. An apparatus according to claim 1 wherein said path is a closed circular path.

3. An apparatus according to claim 2 wherein said tool magazine is a circular disc-shaped magazine having radially inwardly extending rectangular recesses on the periphery thereof to receive said tool holders, said tool magazine having an axis of rotation parallel to the axis of rotation of the workpiece.

4. An apparatus according to claim 1 wherein said longitudinal guide means of said lathe includes first and second column guides supported at both ends and wherein said magazine surrounds one of said guides.

5. An apparatus according to claim 3 and including permanent seal means between said tool holders and said disc magazine and between said disc magazine and said cross slide for preventing passage therethrough of turnings from the workpiece.

* * * * *